US008099738B2

(12) United States Patent
Akiyama et al.

(10) Patent No.: US 8,099,738 B2
(45) Date of Patent: Jan. 17, 2012

(54) MESSAGE DISPLAY DEVICE WHICH CHANGES A MANNER OF DISPLAYING A MESSAGE OVER TIME, AND A NON-TRANSITORY COMPUTER-READABLE MEDIUM STORING A MESSAGE DISPLAY PROGRAM CHANGES A MANNER OF DISPLAYING A MESSAGE OVER TIME

(75) Inventors: Katsuhiko Akiyama, Kawasaki (JP); Naomi Iwayama, Kawasaki (JP); Kenji Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1102 days.

(21) Appl. No.: 11/869,168

(22) Filed: Oct. 9, 2007

(65) Prior Publication Data

US 2008/0109826 A1    May 8, 2008

(30) Foreign Application Priority Data

Nov. 7, 2006  (JP) ................................. 2006-301852

(51) Int. Cl.
G06F 9/44 (2006.01)

(52) U.S. Cl. ........................................ 719/318; 719/313

(58) Field of Classification Search .................. 719/310, 719/313, 315, 316, 318
See application file for complete search history.

(56) References Cited

U.S. PATENT DOCUMENTS

| | | | | |
|---|---|---|---|---|
| 4,319,337 A * | 3/1982 | Sander et al. | ................. | 715/751 |
| 5,561,702 A * | 10/1996 | Lipp et al. | .................... | 340/7.41 |
| 6,384,848 B1 * | 5/2002 | Kojima et al. | ................. | 715/808 |
| 6,670,964 B1 * | 12/2003 | Ward et al. | ..................... | 345/660 |
| 7,469,272 B2 | 12/2008 | McKee et al. | | |
| 2004/0193688 A1 | 9/2004 | McKee et al. | | |

FOREIGN PATENT DOCUMENTS

| | | |
|---|---|---|
| EP | 1462940 A2 | 9/2004 |
| JP | 64-81021 A | 3/1989 |
| JP | 9-182130 A | 7/1997 |
| JP | 2004-295899 A | 10/2004 |
| JP | 2006-135841 A | 5/2006 |
| WO | 2006/109688 A1 | 10/2006 |

OTHER PUBLICATIONS

Japanese Office Action dated May 24, 2011, issued in corresponding Japanese Patent Application No. 2006-301852.

* cited by examiner

*Primary Examiner* — Van Nguyen
(74) *Attorney, Agent, or Firm* — Westerman, Hattori, Daniels & Adrian, LLP

(57) ABSTRACT

A message display device provided with a display section includes: an event acquisition section for acquiring an event that triggers display of a message on the display section and is associated with the message; a data acquisition section for acquiring a type of an application program and a display mode of an image to be displayed on the display section during execution of the application program; a data storage section for storing the type of the application program, the image display mode thereof, and a message display mode of displaying a message on the display section associated with one another; and a message display control section for, in response to acquisition of the event by the event acquisition section, displays the message associated with the event on the display section in the message display mode recognized from the data storage section.

4 Claims, 14 Drawing Sheets

| APPLICATION SOFTWARE FILE NAME | DISPLAY MODE | MESSAGE DISPLAY MODE |
|---|---|---|
| Abc. exe | any | a) |
| Cde. exe | window | b) |
| Efg. exe | full screen | b) |
| Efg. exe | window | c) |
| ... | | |

Fig. 5

MESSAGE DISPLAY DEVICE WHICH CHANGES A MANNER OF DISPLAYING A MESSAGE OVER TIME, AND A NON-TRANSITORY COMPUTER-READABLE MEDIUM STORING A MESSAGE DISPLAY PROGRAM CHANGES A MANNER OF DISPLAYING A MESSAGE OVER TIME

BACKGROUND OF THE INVENTION

1. Field of the Invention

The present invention relates to a message display device and a computing device that display, in response to an event, the message associated with the event. The present invention also relates to a message display program storage medium in which a message display program is stored and to a computing program storage medium in which a computing program is stored. The message display program and the computing program are incorporated into a data processing apparatus and cause the apparatus to display a message.

2. Description of the Related Art

Conventionally, there are programs that, in response to acquisition of an event, for example, at the arrival of the scheduled time or upon receipt of mail from outside, cause a data processing apparatus with a display section typified by a personal computer and a portable terminal to display the message associated with that event.

In addition to such a message display program, the data processing apparatus device executes various application programs such as a word processor, and thus frequently acquires an event while an operator is using an application program. If a message for the acquired event is displayed outstandingly for notifying acquisition of the event such that the message overlaps the screen for the executed application program, the message may interrupt operation of an operator and may lead to mistyping and incorrect operation of a mouse. On the contrary, if a small message is displayed near the corner of a display screen so that the message does not stand out, the problem is that the operator may find the message too small and ignore it or miss it.

One method to deal with such a problem is that a manner of displaying a message changes such that a small message is displayed at first, and then is enlarged gradually so as to be conspicuous. For example, Japanese Patent Laid-Open No. 9-182130 discloses the technique in which a message display manner changes over the predetermined time. In addition, Japanese Patent Laid-Open No. 1-081021 discloses the method with a different purpose, in which a message is displayed under the condition that there is no key operation for the predetermined time, so that the message does not interrupt operation of an operator.

However, as circumstances under which an operator operates a data processing apparatus vary, even if a message display manner changes after the predetermined time, that manner may not satisfy every operator. It holds true also in a case where a message is displayed only when there is no key input operation. For example, if an operator is concentrating on operation such as a playing game, the operator may not wish enlarged display of a message. Alternatively, if an operator is making a presentation using a presentation tool, even a small message obstructs the presentation.

SUMMARY OF THE INVENTION

The invention has been made in view of the above circumstances and provides a message display device, a computing device, a message display program storage medium and a computing program storage medium that make it possible to display a message in such a way not to interrupt operation of an operator.

According to the present invention, a medium storing a message display program, the message display program being incorporated in a data processing apparatus and causing the apparatus to operate as a message display device, the apparatus including a display section for displaying an image and a storage device and executing programs including an application program for performing processing including display of an image on the display section, the message display device includes:

an event acquisition section that acquires an event for triggering display of a message on the display section, the event being associated with the message;

a data acquisition section that acquires a type of an executed application program and a display mode of an image to be displayed on the display section during execution of the application program;

a data storage section that stores the type of the application program, the image display mode thereof, and a message display mode for displaying a message on the display section such that they are associated with one another; and a message display control section which, in response to acquisition of an event by the event acquisition section, recognizes, from the data storage section, the message display mode of the message associated with the type of the application program and the image display mode thereof, and displays the message associated with the event on the display section in the recognized message display mode.

In the message display device and the message display program storage medium according to the present invention, as the type of the application program, the image display mode thereof, and the message display mode associated with one another are stored, a message is displayed in the message display mode associated with the type of the application and the image display mode thereof. Thus, the message display device of the present invention displays a message in the massage display mode in accordance with the state of the executed application, which does not interrupt an operator's operation.

Here, preferably in the message display device of the present invention, a first mode is provided as one message display mode stored in the data storage section associated with a type of and an image display mode of an application program, the first mode changing a manner of displaying a message over time; and the message display control section, in response to acquisition of an event by the event acquisition section, causes the display section to display a message associated with the event in the first mode on the display section, when the message display control section recognizes, from the data storage section, the first mode as a message display mode associated with the type and the image display mode of the application program.

If the application program is of a specific type, for example, a word processor, by changing a manner of displaying a message, for example, by gradually enlarging the image of the message, it is possible to notify an operator of the message without interrupting his or her operation.

Further, according to the present invention, a medium storing a computing program, the computing program being incorporated in a data processing apparatus and causing the apparatus to operate as a computing device, the apparatus including a display section for displaying an image and a storage device and executing programs, the computing device includes:

a data processing section that executes an application program for performing processing including display of a message on the display section;

an event acquisition section that acquires an event for triggering display of a message on the display section, the event being associated with the message;

a data acquisition section that acquires a type of an application program and a display mode of an image to be displayed on the display section during execution of the application program;

a data storage section that stores the type of the application program, the image display mode thereof, and a message display mode of displaying a message on the display section such that they are associated with one another; and a message display control section which, in response to acquisition of an event by the event acquisition section, recognizes, from the data storage section, the message display mode of the message associated with the type of an application program and the image display mode thereof, and displays the message associated with the event on the display section in the recognized message display mode.

According to the computing device, it is possible to prevent a case in which an operation of the application program executed in the data processing section is interrupted by displaying a message in response to acquisition of an event.

As described above, according to the message display device, the computing device, the message display program storage medium, and the data processing storage medium of the present invention, a message is displayed in a display mode associated with the type of the application program and the image display mode thereof, and thus an operation of an operator is not interrupted.

BRIEF DESCRIPTION OF THE DRAWINGS

FIG. 5 shows an example of a display mode table stored in an application data storage section;

DETAILED DESCRIPTION OF THE INVENTION

Exemplary embodiments of the invention will be described with reference to the drawings.

Figure 1:
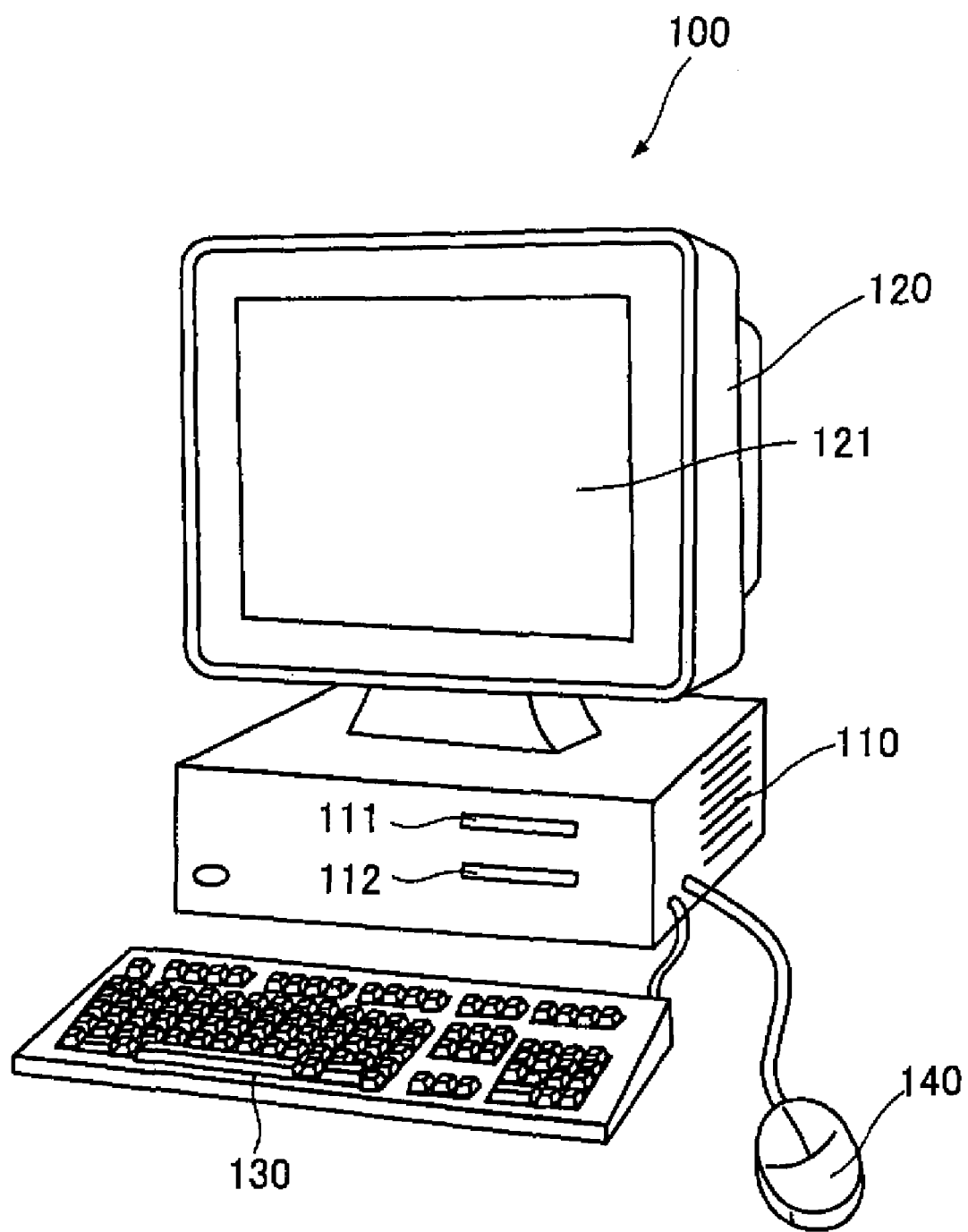
FIG. 1 is an external perspective view of a personal computer operated as one embodiment of a computing device and a message display device of the present invention.
Figure 2:
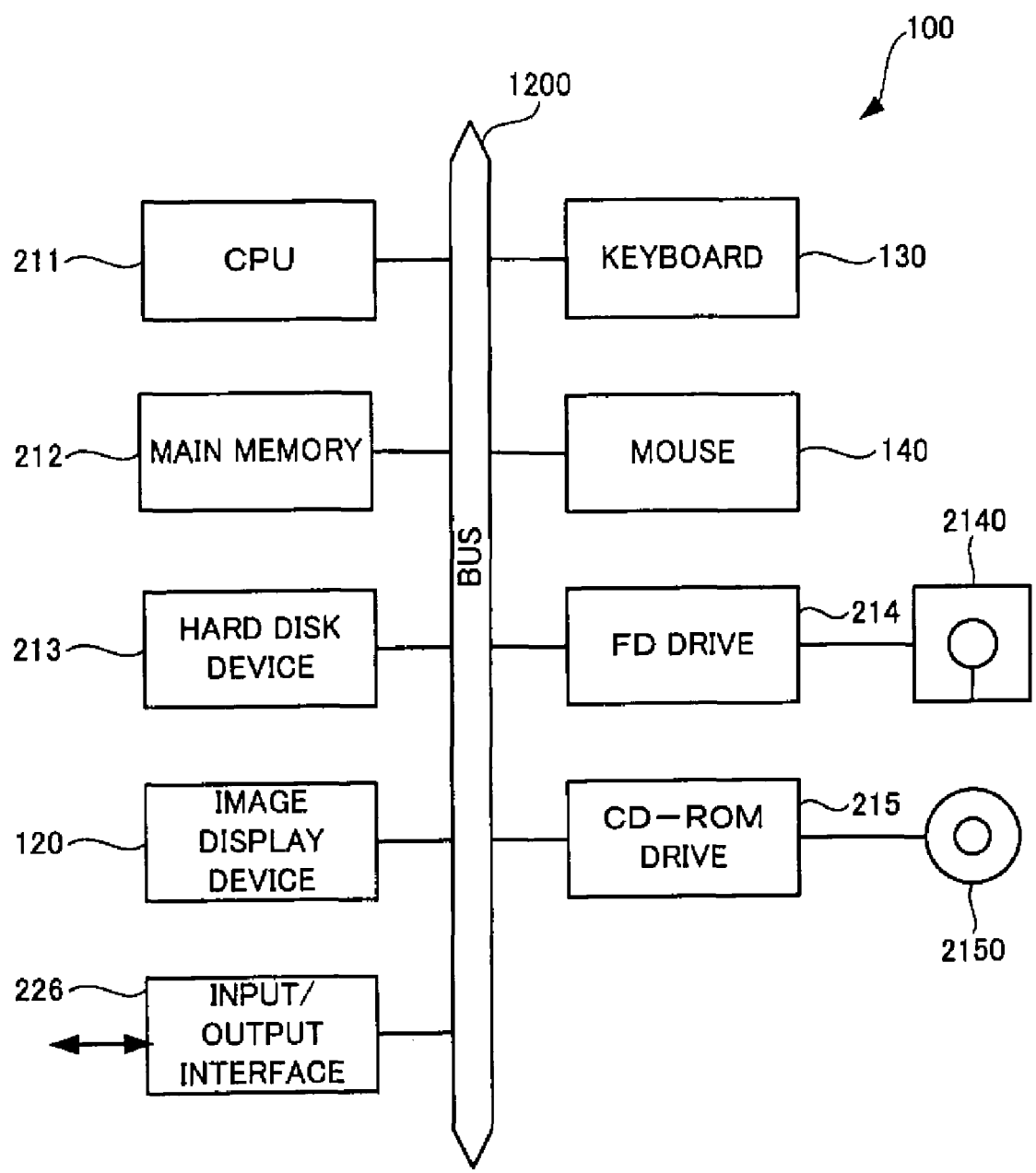
FIG. 2 is a hardware configuration diagram of the computer shown in FIG. 1.

FIG. 1 is an external perspective view of a personal computer operated as one embodiment of the computing device and the message display device of the present invention, and FIG. 2 is the hardware configuration diagram thereof.

A personal computer 100 (hereafter referred to as simply computer 100) comprises: a main unit 110 including a CPU, a hard disk and an RAM memory incorporated therein which will be described later, an image display apparatus 120 including a CRT and an LCD for displaying an image on display screen 121 with an instruction from the main unit 110, a keyboard 130 for receiving input operation of inputting a user instruction and text information in the computer 100, mouse 140 for designating any position on the display screen 121 and thereby inputting the instruction associated with the designated position. In the present invention, the computer 100 corresponds to an example of the computing device and the message display device, the image display apparatus 120 corresponds to an example of the display section, and the main memory 212 corresponds to an example of the data storage section according to the invention.

The main unit 110 further includes FD loading port 111 for loading a flexible disk (hereafter referred to as FD) and CD-ROM loading port 112 for loading a CD-ROM, and incorporates FD drive and CD drive, which will be described later, for driving loaded FD and CD-ROM respectively.

As shown in FIG. 2, the computer 100 includes, in the main unit 110, CPU 211 that performs various programs, the main memory 212 used for reading the programs stored in the hard disk device 213 and executed by the CPU 211, the hard disk device 213 in which various programs and data are stored, FD drive 214 for accessing FD 2140 loaded therein, CD-ROM drive 215 for accessing CD-ROM 2150 loaded therein. These elements as well as the image display apparatus 120, the keyboard 130 and the mouse 140 shown in FIG. 1 are connected to one another via bus 1200. Further, the computer 100 incorporates input/output interface 226 for exchanging email with an external apparatus (not shown) connected thereto. The input/output interface 226 is also connected to each of the above-described elements constituting the computer 100 via the bus 1200. Note that the computer 100 is capable of operating any operation program (hereafter referred to as "application") such as a word processor and a presentation tool in addition to a computing program and a message display program, which will be described later.

Next, one embodiment of the medium storing the computing program and the medium storing the message display program according to the present invention will be described.

The computing program and message display program according to the present invention are stored, for example, in the CD-ROM 2150. When the CD-ROM 2150 is loaded into the main unit 110 by way of the loading port 112, then, for example, the computing program stored in the CD-ROM 2150 is installed by the CD-ROM drive 215 in the hard disk device 213. When the computing program installed in the hard disk device 213 is executed, the computer 100 operates as the one embodiment of the computing device according to the present invention. Similarly, if the message display program is stored in the CD-ROM 2150, the computer 100 operates as one embodiment of the message display device.

Figure 3:
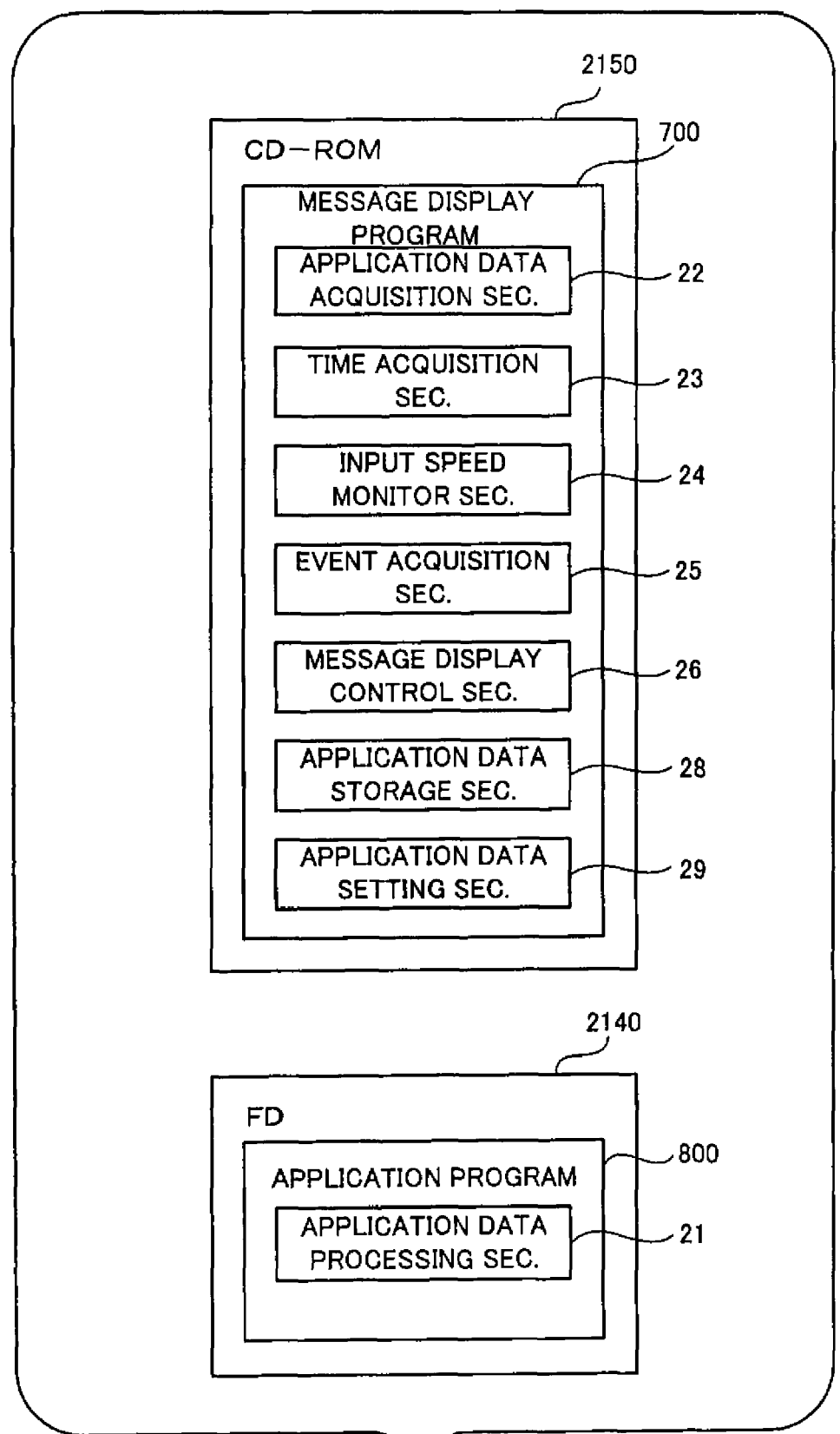
FIG. 3 shows one embodiment of a computing program and a message display program according to the present invention.

FIG. 3 shows the one embodiment of the medium storing the computing program and the medium storing the message display program according to the present invention.

Here, a message display program 700 is stored in the CD-ROM 2150 while an application program 800 is stored in the FD 2140. The message display program 700 has a scheduler function with an alarm while the application program 800 has functions for a word processor, a presentation tool and a game. Note that a medium for storing the message display program 700 and the application program 800 of the present invention is not limited to the CD-ROM 2150 or the FD 2140, but may be the hard disk device 213 shown in FIG. 2 or another type of storage medium such as a DVD and a MO (not shown).

As described above, the message display program 700 and the application program 800 are executed in the computer 100 shown in FIGS. 1 and 2 so as to cause the computer 100 to operate as the one embodiment of the computing device and the message display device according to the present invention. The message display program 700 comprises application data acquisition section 22, time acquisition section 23, input speed monitor section 24, event acquisition section 25, message display control section 26, application data storage section 28, and application data setting section 29 as program module(s). The application program 800 comprises application data processing section 21 as program module(s). The application data processing section 21 corresponds to an example of the data processing section according to the present invention and the application data acquisition section 22 corresponds to an example of the data acquisition section according to the present invention. In addition, the application data storage section 28 corresponds to an example of the data storage section, and the message display control section 26 corresponds to an example of the message display control section according to the present invention. Further, the input speed monitor section 24 corresponds to an example of the speed monitor section, and the application data setting section 29 corresponds to an example of the data setting section according to the present invention. Furthermore, a combination of the message display program 700 and the application program 800 corresponds to an example of the computing program according to the invention.

Figure 4:
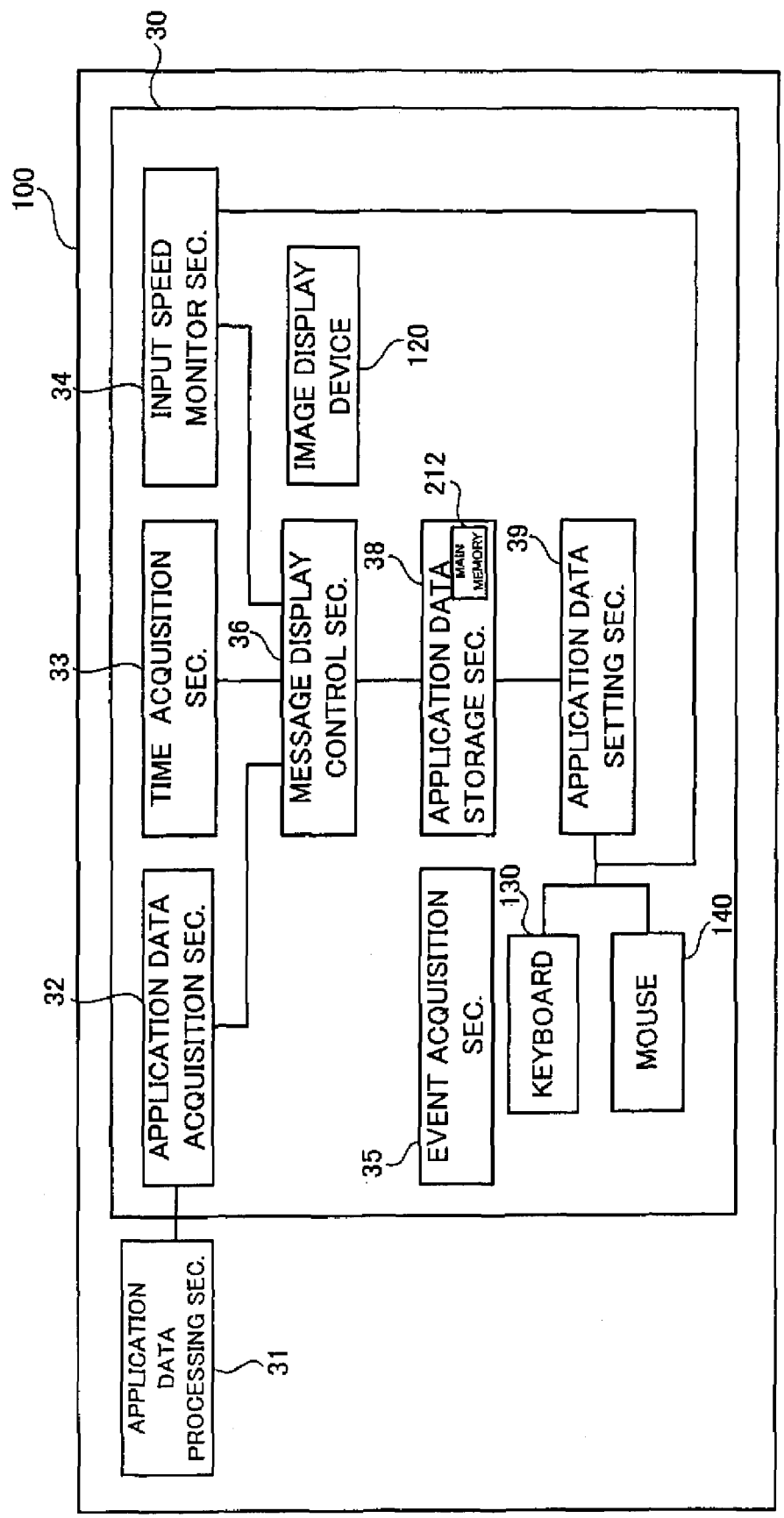
FIG. 4 shows elements of the computer shown in FIGS. 1 and 2 to be implemented when the computer is caused to operate as one embodiment of the computing device according to the present invention.

FIG. 4 shows elements of the computer 100 shown in FIGS. 1 and 2 to be implemented when the computer 100 is caused to operate as one embodiment of the computing device according to the present invention.

When the massage display program 700 shown in FIG. 3 is installed in the computer 100 shown in FIGS. 1 and 2, message display section 30 shown in FIG. 4 is implemented. The message display section 30 includes application data acquisition section 32, time acquisition section 33, input speed monitor section 34, event acquisition section 35, message display control section 36, application data storage section 38, and application data setting section 39. In addition, when the application program 800 shown in FIG. 3 is installed in the computer 100 shown in FIGS. 1 and 2, application data processing section 31 is implemented. The computer 100 with the message display section 30 implemented therein corresponds to an example of the message display device according to the present invention. The application data processing section 31, the application data acquisition 32, the time acquisition section 33, the input speed monitor section 34, the event acquisition section 35, the message display control section 36, the application data storage section 38, and the application data setting section 39 are elements to be implemented in the computer 100 by each of the application data acquisition section 22, the time acquisition section 23, the input speed monitor section 24, the event acquisition section 25, the message display control section 26, the application data storage section 28, and the application data setting section 29 of the message display program 700, and the application data processing section 21 of the application program 800. Thus, each of elements shown in FIG. 3 corresponds to the relative sections of FIG. 4. However, note that the sections shown in FIG. 4 are constituted by hardware of the computer 100 and a combination of the OS and programs to be executed in the computer 100, while the sections shown in FIG. 3 are constituted only by the message display program 700 and the application program 800. Now, the sections shown in FIG. 4 will be described below in detail.

The application data processing section 31 executes one of the application programs designated by a user from a word processor, a presentation tool and a game. These application programs provide instructions for processing including display of an image on the image display apparatus 120. The application data processing section 31 displays an image of an application program in the display mode selected by user operation. Display modes for displaying an image of each application program are the full-screen mode for displaying an image using the whole of the display screen 121 of the image display apparatus 120 and the window mode for displaying an image in a window that occupies a partial area of the display screen 121.

The application data acquisition section 32 acquires data on the type of the application being executed by the application data processing section 31 and the display mode of an image to be displayed on the image display apparatus 120 by executing the application. More particularly, the application data acquisition section 32 acquires, from the application data processing section 31, a file name representing the type of the application being executed in the application data processing section 31 and data on whether full-screen mode or window mode is used for displaying the image.

The input speed monitor section 34 monitors the input operation speed of the keyboard 130 and mouse 140 that receive input of operation. More specifically, the input speed monitor section 34 outputs data representing the operation speed of the keyboard 130 and mouse 140.

The event acquisition section 35 acquires an event that triggers display of a message and is associated with the message. As the event acquisition section 35 according to the present embodiment has a scheduler function with an alarm, if an operator has registered beforehand a predetermined time associated with a specific message, the event acquisition section 35 outputs event data notifying the arrival of the registered time. The output event data includes the registered message.

The time acquisition section 33 has a function for monitoring the duration of time elapsed after acquisition of an event in the mode in which message display is changed dynamically over the elapsed time.

The application storage section 38 including the main memory 212 stores the types of applications, the modes of displaying an image, and the modes of displaying a message on the image display apparatus 120.

FIG. 5 shows an example of a display mode table stored in the application data storage section 38.

The display mode table is stored in the main memory 212 of the application data storage section 38 such that, by each row, the type of an application, the display mode of displaying an image, and the message display mode of displaying a message on the image display apparatus 120 are associated with one another. Note that according to the present embodiment a file name of an application is stored as data representing the type of the application.

As shown in FIG. 5, for instance, the fist row of the display mode table indicates that when the file name of the application is "Abc. exe" meaning a word processor and the image display mode of an image to be displayed on the image display apparatus 120 by the word processor is "any" meaning any of full-screen mode and window mode, the associated message display mode is "a)" of the first a), the second b) and the third c). Detailed description of each message display mode will be descried later. Further, the second row indicates that when the file name of the application is "Cde. exe" meaning a presentation tool and the display mode of displaying an image on the image display apparatus 120 by the presentation tool is "window" mode, the associated message display mode is the second mode "b)." Further, the third row shows that when the file name of the application is "Efg. exe" meaning a game and the display mode of displaying an image on the image display apparatus 120 by the game is "full-screen" mode, the associated message display mode is the second mode "b)." In addition, the fourth row shows that when the file name of the application is similarly "Efg. exe" meaning a game and the display mode of displaying an image on the image display apparatus 120 by the game is "window" mode, the associated message display mode is the third mode "c)."

Referring back to FIG. 4, the application data setting section 39 selects a message display mode to be stored in the application storage section 38 associated with the type of an application and the image display mode. The selection of message display modes is conducted by input operation of the keyboard 130 and mouse 140.

Figure 6:
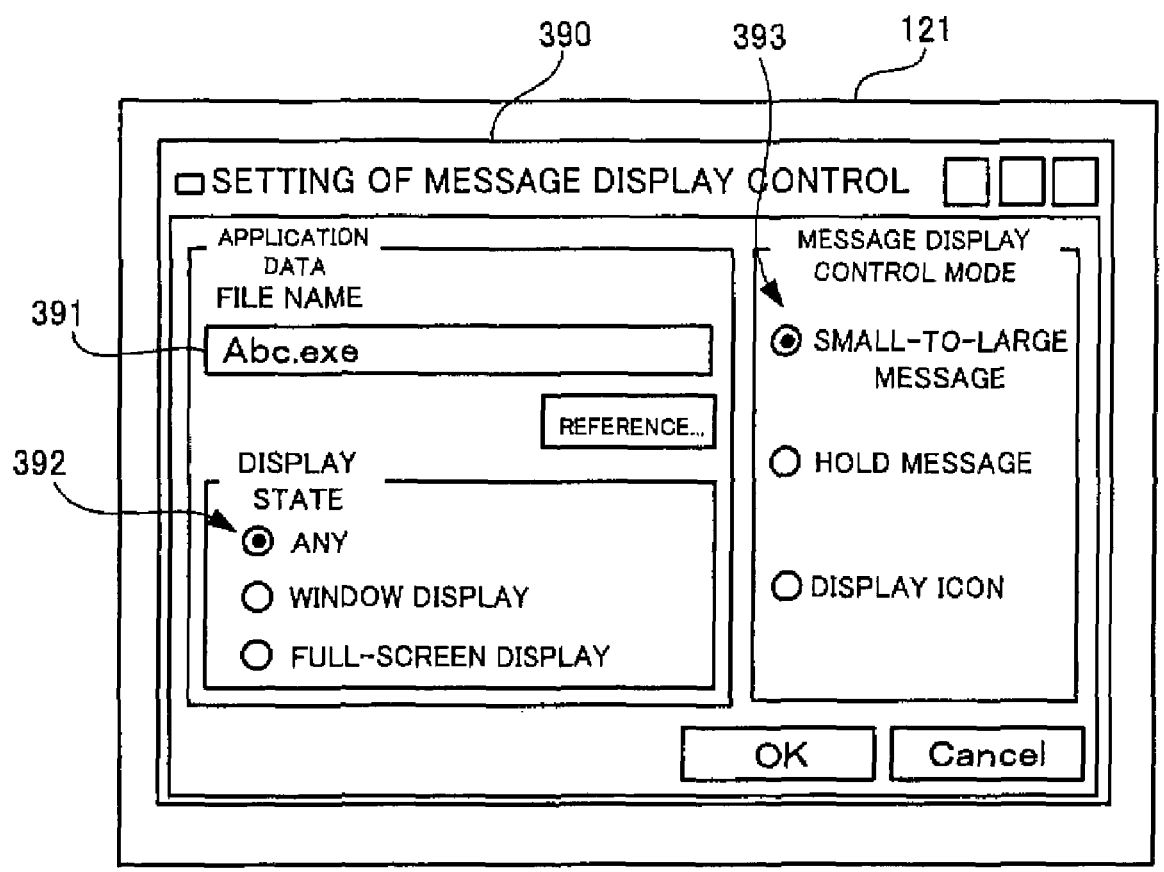
FIG. 6 shows a selection screen to be displayed when an application data setting section selects a message display mode.

FIG. 6 shows a selection screen to be displayed when the application data setting section 39 selects a message display mode.

When the application data setting section 39 selects a message display mode, it causes the image display apparatus 120 to display a selection screen 390 on the display screen 121. File name entry field 391, display mode radio buttons 392 for selecting a mode for displaying an image of an application, message mode radio buttons 393 for selecting a message display mode are arranged on the selection screen 390. When the selection screen 390 is displayed and an operator inputs, by using the keyboard 130 and mouse 140, a file name of an application in the file name entry field 391 and respectively selects one of the display mode radio buttons 392 and the message mode radio buttons 393, the application data setting section 39 stores in the application data storage section 38 the input file name, the selected image display mode of the application and message display mode associated with one another. According to the example shown in FIG. 6, "Abc. exe," for the file name of a word processor and "any" for the image display mode by the application are stored associated with the first mode a) for message display mode, as indicated by the first row of FIG. 5.

Referring back to FIG. 4, the message display control section 36 displays, in response to acquisition of an event by the event acquisition 35, the message associated with the received event on the image display apparatus 120. At that time, the message display control section 36 recognizes, from the application data storage section 38, the message display mode associated with the type of the application and the display mode of the image by the application being executed by the application data processing section 31, and displays the message with the recognized display mode. More specifically, upon receipt of the event data output from the event acquisition section 35, the message display control section 36 obtains from the application data acquisition section 32 the file name data of the application being executed by the application data processing section 31 as well as the display mode data as to whether full-screen mode or window mode. Further, the message display control section 36 reads, from the display mode table (see FIG. 5) stored in the application data storage section 38, a message display mode associated with the obtained file name data and image display mode data and displays the message included in the received event data on the image display apparatus 120 in the display mode represented by the read message display mode. If no message display mode associated with the obtained file name data and image display mode data is stored in the display mode table shown in FIG. 5, the first mode a) is selected by default.

Now, referring to FIGS. 7 through 9, each of message display modes displayed by the message display control section 36 will be described.

Figure 7:
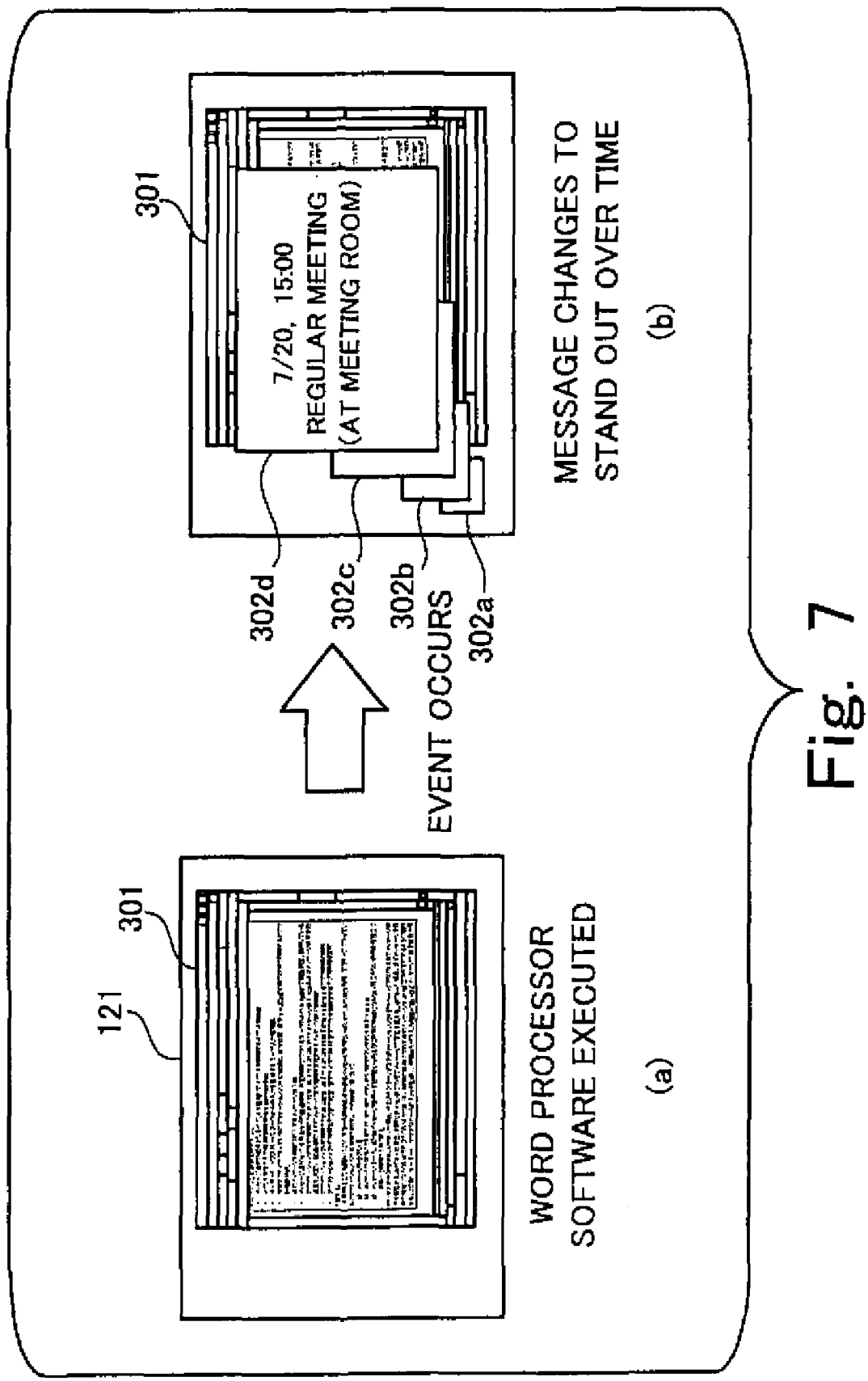
FIG. 7 illustrates a first message display mode.

FIG. 7 illustrates a first mode (mode a) shown in FIG. 5) of the message display modes. Part (a) of FIG. 7 shows the display screen 121 of the image display apparatus 120 before occurrence of an event. Part (b) of FIG. 7 shows the display screen 121 after occurrence of the event.

According to the first mode shown in FIG. 7, a manner of displaying a message changes over time. For instance, as shown in part (a) of FIG. 7, when an event is acquired while a screen for a word processor application is being displayed on a window 301 that occupies a part of the display screen 121, a small sized message image 302a representing, for instance, "7/20, 15:00, REGULAR MEETING (AT MEETING ROOM)" is displayed at first at lower left. Subsequently, message images 302b, 302c and 302d of the identical message but respectively having a gradually enlarged size are sequentially displayed over time. Accordingly, if the first mode is employed when general applications such as a word processor is being executed, the message image 302 (i.e., 302a through 302d) is displayed at first in a size that does not obstruct a user and gradually increases its size so as to stand out.

The change rate of the message display mode according to the first mode can be altered according to the input operation speed of the keyboard 130 and mouse 140. According to the present embodiment, the message display control section 36 modifies the change rate of enlarging the message image 302. For example, when the number of key inputs for the past 5 seconds is "c," the number of pixels per sec. for enlarging the message image 302 is obtained by the expression: max (10, 60-10c), where the function max (x, y) is either of x and y, whichever is larger. Thus, if there is no key input operation by the keyboard 130, the message image 302 is displayed so as to be enlarged by 60 pixels per sec. If, for instance, the number of key inputs for the past 5 seconds is one, the message image 302 is displayed so as to be enlarged by 50 pixels per sec. If the number of key inputs for the past 5 seconds is five, the message image 302 is displayed so as to be enlarged by 10 pixels per sec. Alternatively, if the mouse 140 is operated instead of the keyboard 130, the number of pixels per sec. for enlarging the message image 302 is obtained when the number of times that the mouse 140 has been operated for the past five seconds is "c." Accordingly, more often input operation of the keyboard 130 and mouse 140 are preformed, decreased is the change rate of the message image 302. Thus, when an operator operates the keyboard 130 or mouse 140 frequently, it is possible to prevent the massage image 302 from being quickly enlarged and thereby from interrupting the operator's operation.

Figure 8:
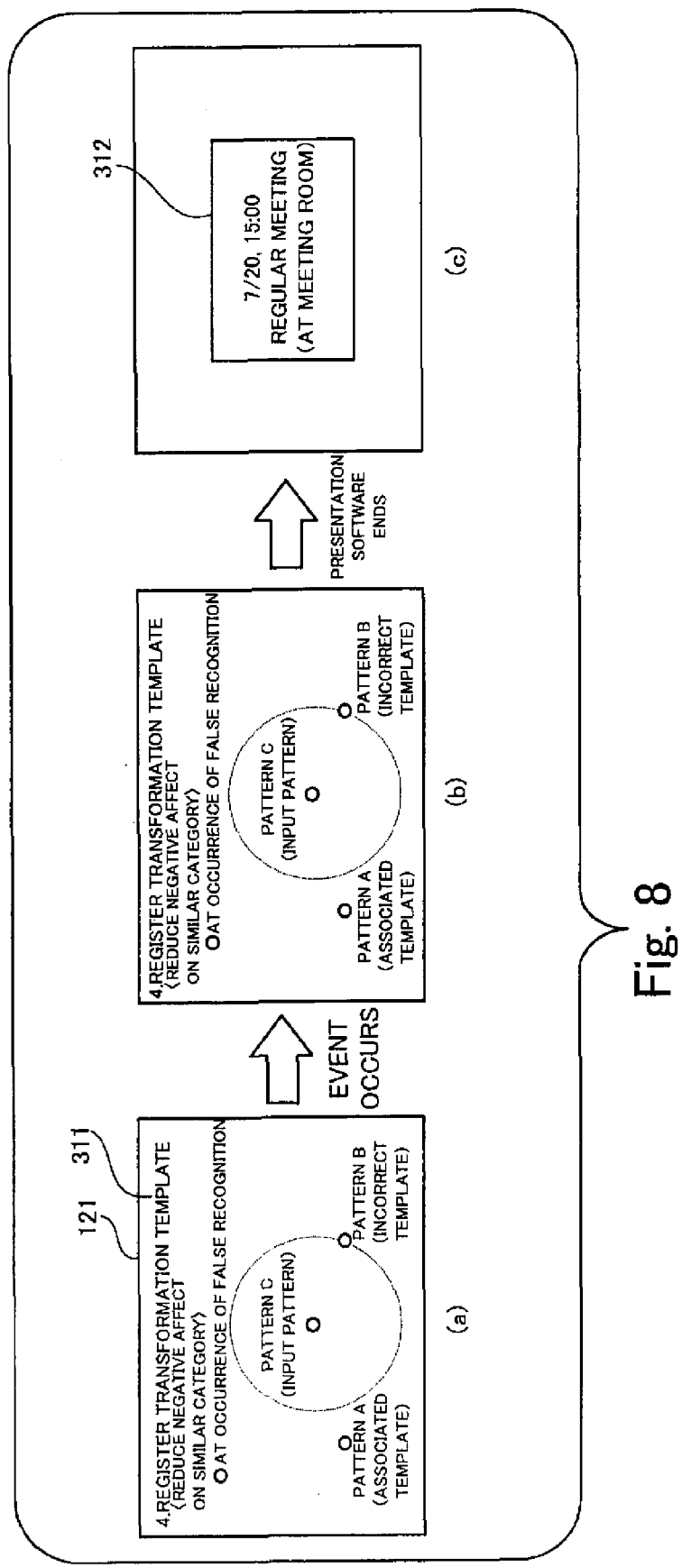
FIG. 8 illustrates a second message display mode.

FIG. 8 illustrates a second mode (mode b) shown in FIG. 5) of the message display modes. Part (a) of FIG. 8 indicates the display screen 121 of the image display apparatus 120 before occurrence of an event, Part (b) of FIG. 8 indicates the display screen 121 after occurrence of the event, and Part (c) of FIG. 8 indicates the display screen 121 after the execution of an application.

According to the second mode, a message image is displayed upon change in the display mode of the application or completion of the application. As shown in Part (a) of FIG. 8, when an event occurs while a presentation tool screen is displayed, display of the message image is held, as shown in Part (b) of FIG. 8, until the display mode of the presentation tool changes or its execution ends. Upon change in display mode of the presentation tool or completion of its execution, the message image 312 is displayed as shown in Part (c) of FIG. B. In presentations and the like using a presentation tool, a message image irrespective of its size is likely to interrupt the presentation, if it appears in the middle of the presentation. However, the second mode in which display of a message image is held is set, the message image does not interrupt such a presentation.

Figure 9:
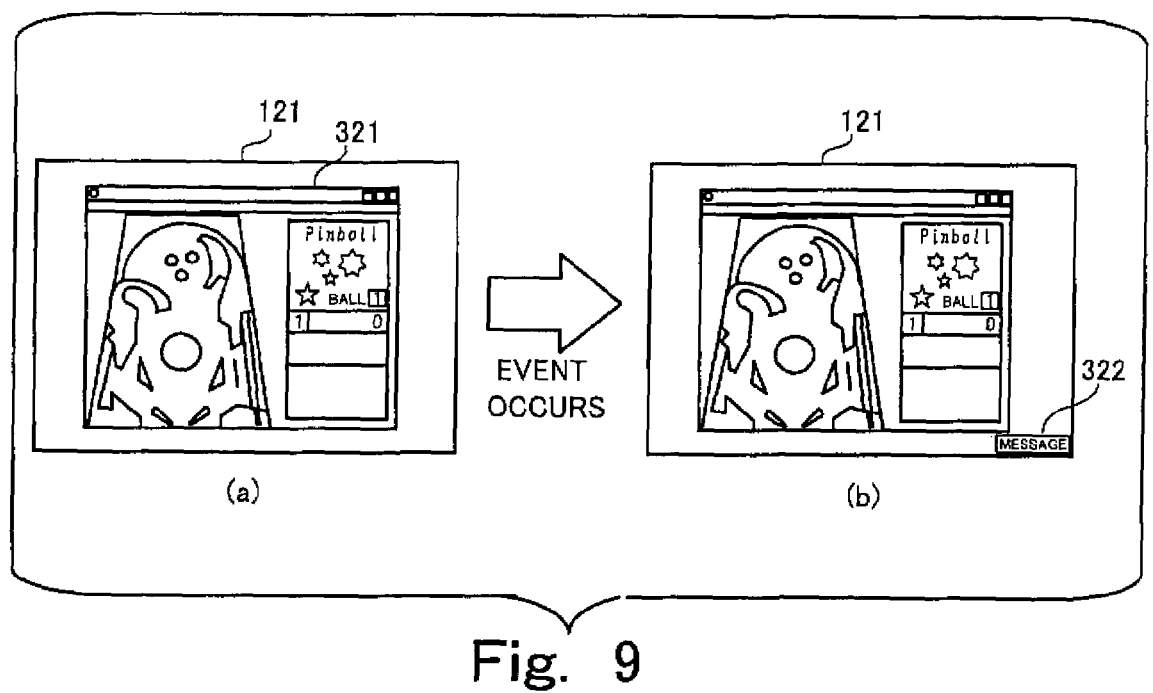
FIG. 9 illustrates a third message display mode.

FIG. 9 illustrates a third mode (mode c) shown in FIG. 5) of the message display modes. Part (a) of FIG. 9 indicates the display screen 121 of the image display apparatus 120 before occurrence of an event and Part (b) of FIG. 9 indicates the display screen 121 after occurrence of the event.

According to the third mode, a symbolic image is displayed instead of directly displaying a message image. As shown in Part (a) of FIG. 9, if an event occurs when a game screen 321 is displayed on a widow that is a part of the display screen 121, as shown in Part (b) of FIG. 9, a small icon 322 with the description of "message" for notifying the presence of a message is displayed at the lower right corner of the display screen 121. An operator can notice the presence of a message by the icon 322, but the game operation cannot be interrupted, as a message screen does not overlap the game screen 321. Note that a message is displayed by clicking the icon 322 using the mouse 140.

According to the first and third modes, the message display control section 36 respectively displays the initial message image 302a and the icon 322 such that they do not overlap the area for displaying the executed application and thus do not interrupt an operator's operation.

Figure 10:
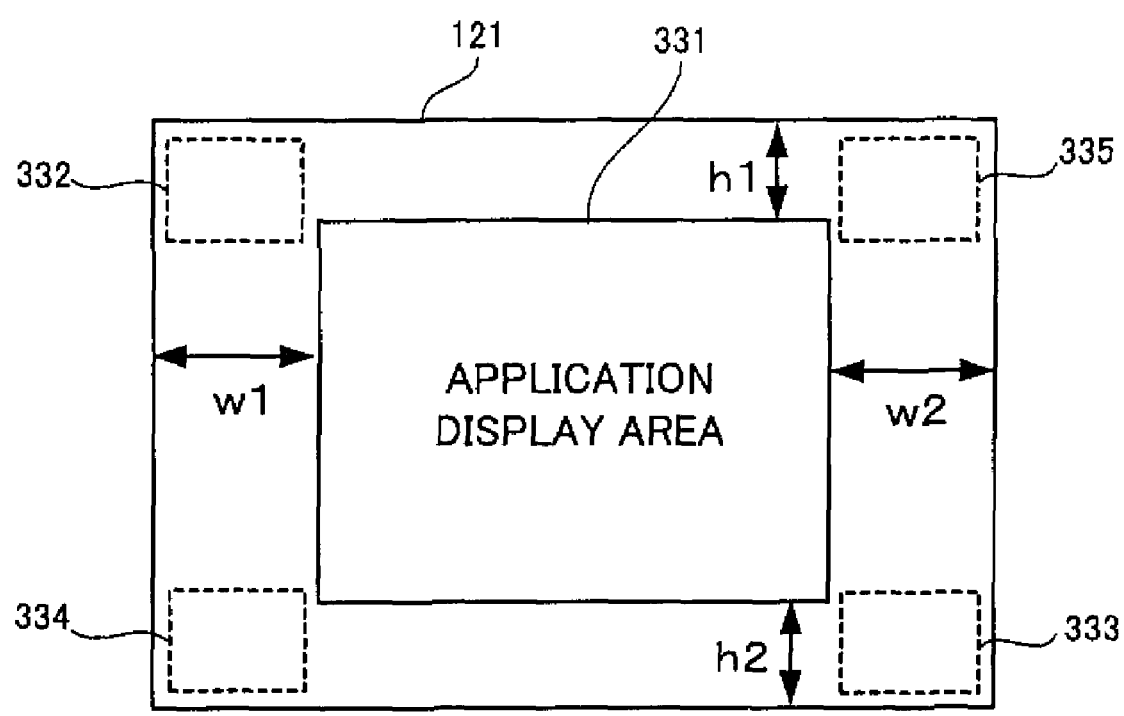
FIG. 10 shows positions where an application image, an initial message image, and an icon are to be displayed.

FIG. 10 shows positions where an application image, an initial message image, and an icon are to be displayed on the display screen 121.

Here, in the display screen 121, it is assumed that the height of an upper margin above the display area 331 for the executed application image is h1, and the corresponding height of a lower margin is h2, the width of a left margin beside the display area 331 is w1 and that of a right margin is w2. Additionally, it is assumed that the length of a message image is r1, and its width is r2, and the aspect ratio r is obtained by the expression: r1:r2=r1/r2=r. Then, the initial width of the massage image is selected from the maximum value of the following expressions (1) through (4).

$$h1/r \quad (1)$$

$$h2/r \quad (2)$$

$$w1 \quad (3)$$

$$w2 \quad (4)$$

where the length of the initial message image is obtained by the width multiplied by the ratio r. The position in which the initial message image is displayed is determined by one selected among from the above expressions (1) through (4). For instance, when the expression (1) is selected, an area 332 at the upper left corner of the application image 331 on the display screen 121 is selected. If the expression (2) is selected, an area 333 at the lower right corner is selected. Further, if the expression (3) is selected, an area 334 at the lower left corner is selected, and if the expression (4) is selected, an area 335 at the upper right corner is selected. Thus, the initial message image is displayed in the maximum size so as not to overlap the executed application image 331.

Now, message display processing by the computer 100 will be described using the flowchart shown in FIGS. 11 through 14.

Note that, in the application data processing section 31 of the computer 100, an application program designated by an operator from a word processor, a presentation tool and a game is being executed and message display processing shown in FIGS. 11 through 14 are performed in parallel with the application processing.

Figure 11:
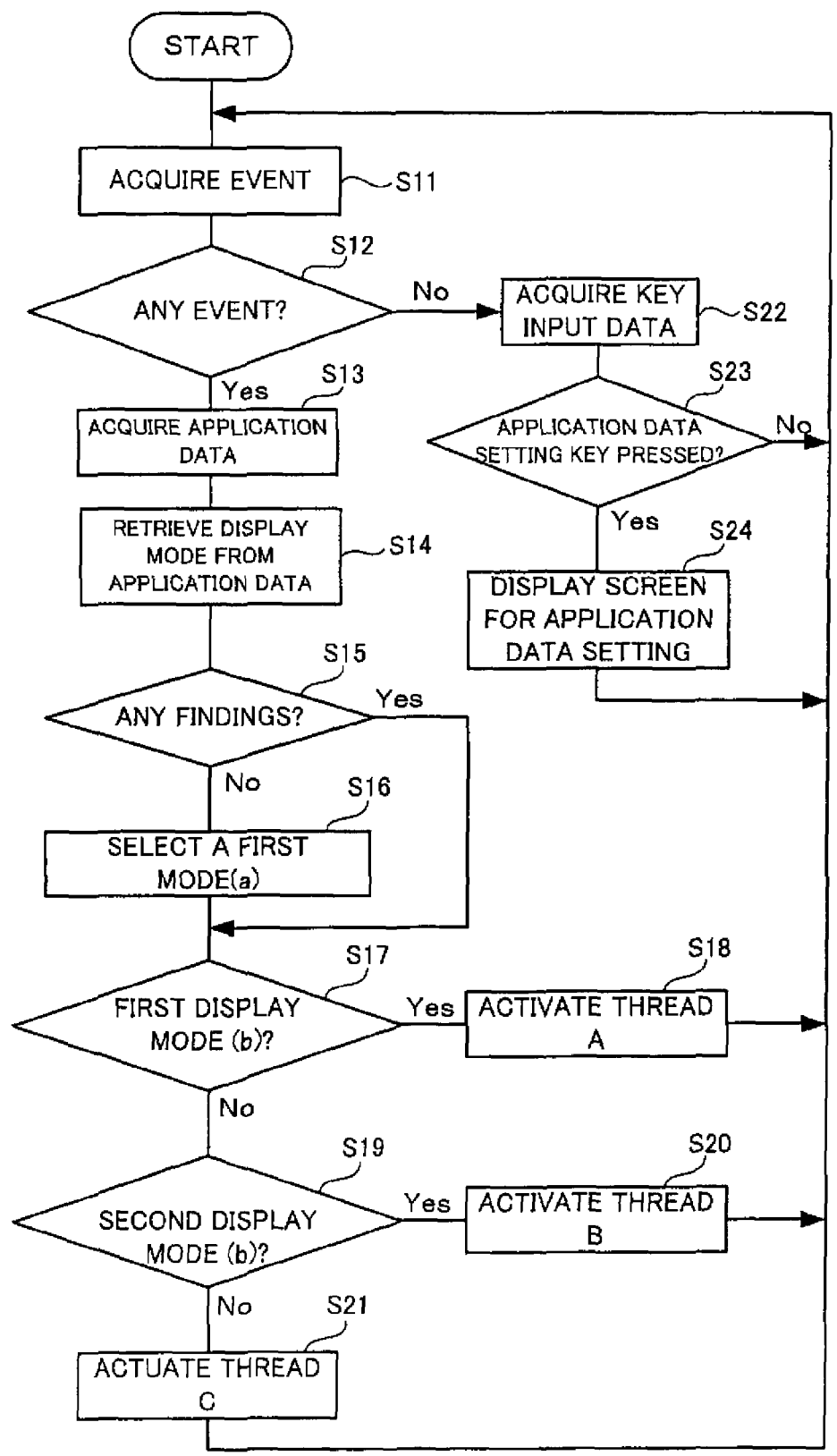
FIG. 11 is a flowchart showing main data processing operated by the computer shown in FIG. 1.

FIG. 11 is a flowchart showing main data processing operated by the computer 100.

In the main data processing shown in FIG. 11, at first, acquisition of an event is performed by the event acquisition section 35 (step S11). More specifically, upon the arrival of a predetermined time registered by an operator, the event acquisition section 35 outputs the event data indicating the arrival of the predetermined time together with a message. If the event is acquired by the event acquisition section 35 (step S12: Yes), the application data acquisition section 32 obtains the file name data (type) of the application being executed by the application data processing section 31 and the image display mode data (step S13). Then, the application display control section 36 retrieves the message display mode data associated with the obtained file name data and display mode data, from the display mode table (see FIG. 5) stored in the application data storage section 38 (step S14). Here, if there exist no message display mode data associated with the obtained file name and display mode in the display mode table, no retrieval result is obtained (step S15: No), and the first mode a) is selected as the default for the message display mode (step S16).

Figure 12:
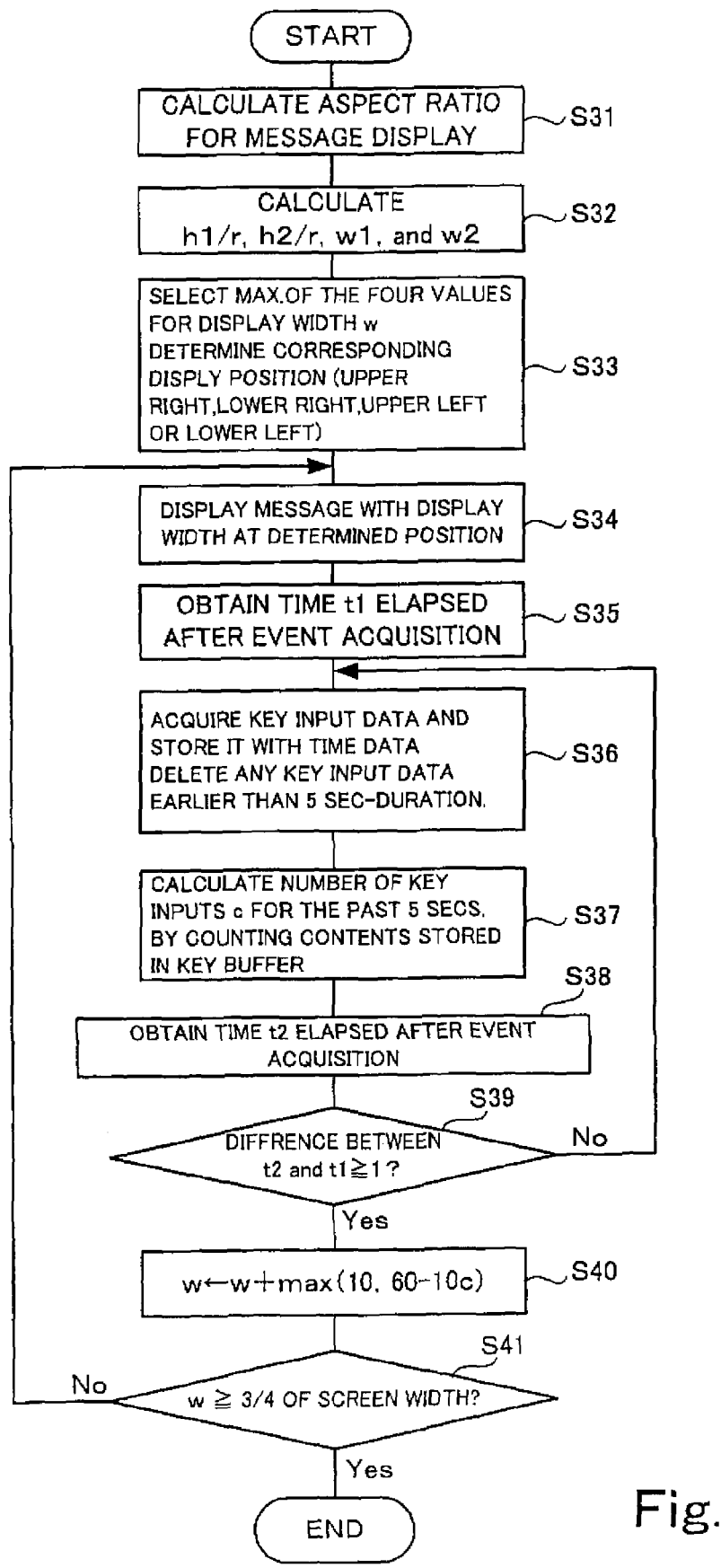
FIG. 12 is a flowchart showing processing by thread A activated in the main data processing shown in FIG. 11.
Figure 13:
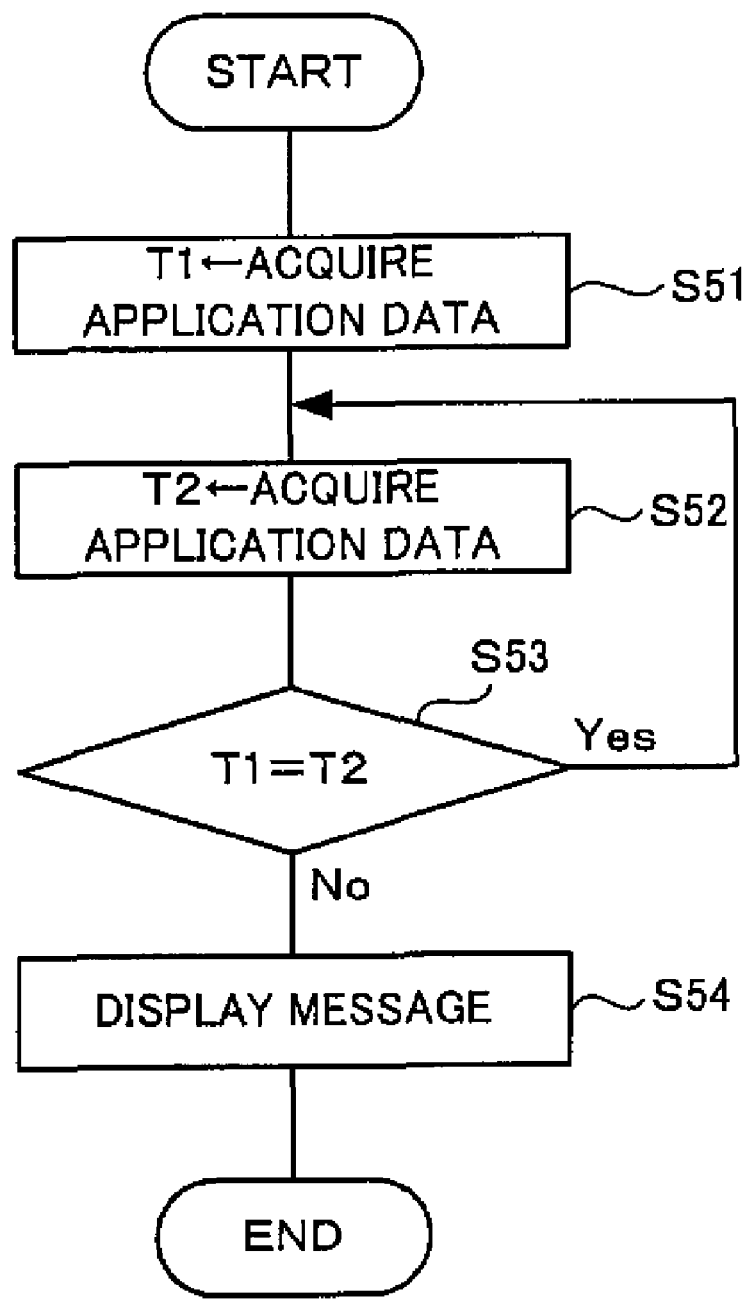
FIG. 13 is a flowchart showing processing by thread B activated in the main data processing shown in FIG. 11.
Figure 14:
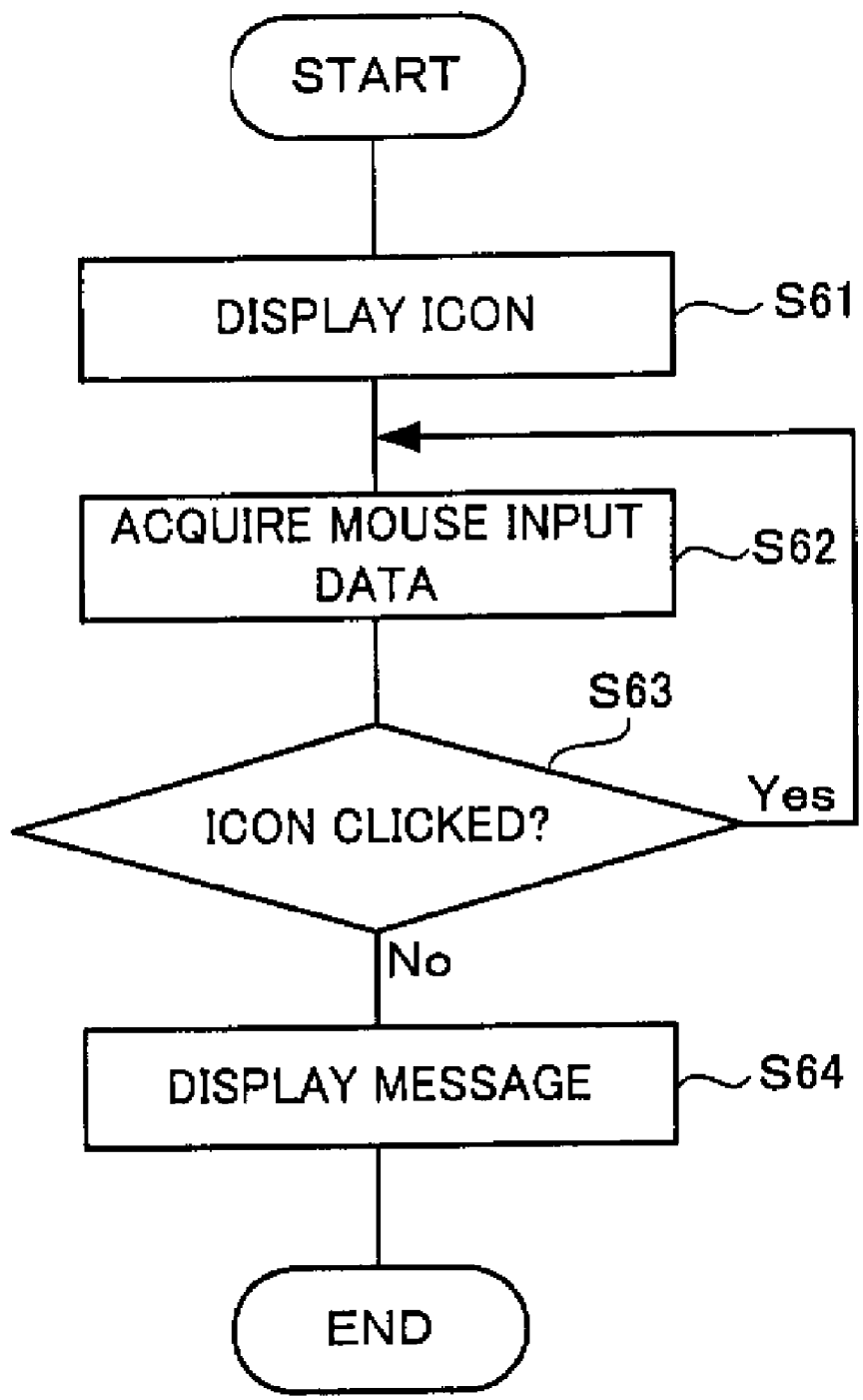
FIG. 14 is a flowchart showing processing by thread C activated in the main data processing shown in FIG. 11.

Next, if the first mode a) is retrieved (step S15: Yes), thread A shown in FIG. 12 is activated (step S18). Alternatively, if the second mode b) is retrieved (step S19: Yes), thread B shown in FIG. 13 is activated (step S20). Further, if the third mode c) is retrieved, thread C shown in FIG. 14 is activated (step S21).

On the other hand, if no event is acquired by the event acquisition section 35 in the processing in step S12 (step S12: No), key input data from the keyboard 130 is acquired (step S22). In step S22, if an application data setting key is pressed (step S23: Yes), the application data setting section 39 displays the selection screen 390 shown in FIG. 6 on the image display apparatus 120, and the message display mode selected by the operation of an operator is stored in the application data storage section 38 (step S24).

FIG. 12 is a flowchart showing processing by thread A activated in the main data processing shown in FIG. 11.

In the thread A, the message display control section 36 displays the message associated with the event in the first mode on the image display apparatus 120.

At first, the message display control section 36 calculates the aspect ratio r of the message image to be displayed (step S31), and then finds the values obtained by the expressions h1/r and h2/r from the heights h1 and h2 of the respective upper and lower margins of the display area for the executed application image 331 as well as widths w1 and w2 at the respective left and right margins (step 832). Next, the maximum value is selected from the four values of h1/r, h2/r, w1, and w2 obtained by step S32 and the selected value is set as the width of a message display image to be displayed. Additionally, a display position corresponding to the selected value is selected from the upper right, lower right, upper left and lower left corners shown in FIG. 10 (step S33).

Next, the message display control section 36 displays the message image having the selected width w at the display position determined by step S33 (step S34). Accordingly, the initial message image 302a is displayed as shown in Part (b) of FIG. 7.

Next, the time acquisition section 33 acquires time t1 elapsed after acquisition of the event (step S35). Subsequently, the input speed monitor section 34 acquires key input data for the past five seconds from the keyboard 130, stores it in a certain key buffer (not shown), and deletes key input data stored earlier than the duration of five seconds (step S36). Further, contents stored in the key buffer, that is, the number of key input data is counted to obtain the number of key input "c" for the past 5 seconds (step S37). Here, the time acquisition section 33 again acquires time t2 elapsed after the acquisition of the event (step S38). The processing from step S36 to step S38 is repeated until time difference between t2 obtained at step S38 and t1 obtained at step S35 becomes a second or more (step S39). Accordingly, the above processing determines the input operation speed per sec. for the past five seconds, with which the message display image changes.

Subsequently, the display width of the message display image is updated (step S40), which is obtained by the expression: w+max (10, 60-10c). In step S40, the message display control section 36 displays the message display image having the updated display width w on the image display apparatus 120.

The processing from step S34 to step S40 is repeated until the updated display width w of the message display image becomes ¾ or more of the width of the display screen 121 (step S41). In this way, the display width w of the message display image is updated approximately every second, and consequently, according to the first mode, the message image changes over time as in the message images 302b, 302c and 302d shown in Part (b) of FIG. 7.

FIG. 13 is a flowchart showing the processing by thread B activated in the main data processing shown in FIG. 11.

In the thread B, the message display control section 36 displays a message associated with an event on the image display apparatus 120 in the second mode.

At first, the message display control section 36 acquires display mode data of the executed application and stores it as a display mode variable T1 (step S51). Secondly, it acquires again display mode data of the executed application and stores it as a display mode variable T2 (step S52), and repeats the processing in step S52 until the display mode variable T2 differs from the display mode variable T1 (step S53). When the display mode variable T2 differs from T1 (step S53: No), the message display control section 36 displays a message image on the image display apparatus 120 (step S54). Accordingly, in the second mode, a message image is displayed upon change in a display mode of the executed application or completion of the execution of the application.

FIG. 14 is a flowchart showing the processing by the thread C activated in the main data processing shown in FIG. 11.

In the thread C, the message display control section 36 displays on the image display apparatus 120 a message associated with an event in the third mode.

At first, the message display control section 36 displays an icon as a symbolic image indicating the presence of a message (step S61). For instance, the icon 322 is displayed on the display screen 121 as shown in Part (b) of FIG. 9.

Subsequently, acquisition of mouse input data is preformed (step S62) If the icon 322 on the display screen 121 is clicked (step S63: Yes), the message image is displayed on the image display apparatus 120.

So far, one embodiment of the present invention has been described, however, the present invention is not limited to that embodiment.

In the above described embodiment, the message display program 700 is stored in the CD-ROM 2150 and the application program 800 is stored in the FD 2140. However, the message display program and the application program may be stored in a single CD-ROM.

Further, in the above described embodiment, the application program 800 has functions for a word processor, a presentation tool, and a game, while the message display program 700 has a function for a scheduler program with alarm. However, the computing program and the message display program of the invention are not limited to these functions. For example, the application program 800 may have functions for a spreadsheet tool, a draw tool, or an image playback tool.

Additionally, in the above described embodiment, the message display control section 36, according to the description of the first mode, gradually enlarges a message image overtime. However, the present invention is not limited to that description. For example, the message display control section 36 may initially display a large message image with high transparency so that the overlapped application program image can be seen and may gradually decrease transparency over time.

Further, in the above described embodiment, a message image is displayed according to the message display mode read out from the application data storage section based on the file name of the application. However, the message display mode may be determined based on a message. Specifically, a specific display mode may be allotted to a certain message, and priority is given to the specific display mode for the certain message rather than the message display mode read out from the application data storage section. For example, if a specific message for emergency is stored associated with data representing a first mode, even if the other messages may be held in the second mode, that specific message associated with the first mode can be displayed promptly.

Additionally, in the above described embodiment, the application data storage section 38 stores a file name of an application program as data indicating the type of the application. However, the application data storage section 38 may store data directly indicating the type of an application classified into the general, a presentation tool, and a game.

Lastly, in the above described embodiment, the application data storage section 38 stores data including the message display mode that is selected by the application data setting section 39 according to input operation by the keyboard 130 and mouse 140. However, for example, such data may be pre-stored without providing the application data setting section 39.

What is claimed is:

1. A message display device which displays a message associated with an event, in response to an acquisition of the event which triggers the display of the message while executing an application program, the message display device comprising:
a display;
an event acquirer which acquires an event for triggering display of the message on the display, the event being associated with the message;
a data acquirer which acquires a type of application program and acquires a display mode of an image to be displayed on the display during execution of the application program;
storage which stores the type of the application program, the image display mode thereof, and a message display mode of displaying a message on the display such that the application program, the image display mode and the message display mode are associated with one another, and the message display mode changes a manner of displaying a message over time;
an input device;
a user input device speed monitor which monitors an input operation speed of the input device; and
a message display controller which, in response to acquisition of the event by the event acquirer, recognizes, from the data storage, the message display mode associated with the type of the application program and the image display mode thereof, and displays the message associated with the event on the display in the selected message display mode, and the message display controller controls a change rate of message display according to the input operation speed monitored by input device the speed monitor.

2. The message display device according to claim 1, further comprising:
an input device which receives input operation; and
a data setter which selects, according to input operation at the input device, a message display mode to be stored in the data storage associated with a type of and an image display mode of an application program.

3. A non-transitory computer-readable medium storing a message display program that causes a computer to execute a process comprising:
acquiring an event for triggering display of a message on a display, the event being associated with the message;
acquiring data of an executed application program and a display mode of an image to be displayed on the display during execution of the application program;
storing a type of the application program, the image display mode thereof, and a message display mode for displaying a message on the display such that the application program, the image display mode and the message display mode are associated with one another, and the message display mode changes a manner of displaying a message over time;
monitoring an input operation speed of a user input device;
displaying the message in response to acquisition of the triggering event, the message display mode is associated with the type of the application program and the image display mode thereof, and
controlling a change rate of the displayed message according to the monitored input operation speed.

4. The non-transitory computer-readable medium storing a message display program according to claim 3, causing the computer to execute the process, the process further comprising:
setting an input device provided in the computer for receiving an input operation, a message display mode to be stored in the storage associated with a type and an image display mode of an application program.

* * * * *